Figure 1:
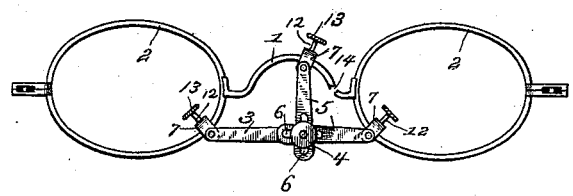

(No Model.)

N. J. EDDY.
REPAIR CLAMP FOR SPECTACLES.

No. 386,004. Patented July 10, 1888.

Witnesses,
Harry S. Rohrer.
T. R. Stuart.

Inventor,
Newton J. Eddy.
By his Attorneys,
Marble + Mason.

UNITED STATES PATENT OFFICE.

NEWTON J. EDDY, OF PORTLAND, MICHIGAN.

REPAIR-CLAMP FOR SPECTACLES.

SPECIFICATION forming part of Letters Patent No. 386,004, dated July 10, 1888.

Application filed February 29, 1888. Serial No. 265,711. (No model.)

*To all whom it may concern:*

Be it known that I, NEWTON J. EDDY, a citizen of the United States, residing at Portland, in the county of Ionia and State of Michigan, have invented certain new and useful Improvements in Repair-Clamps for Spectacle-Frames; and I do hereby declare the following to be a full, clear, and exact description of the invention, such as will enable others skilled in the art to which it appertains to make and use the same.

My invention relates to clamps for holding broken spectacle or eyeglass frames while they are being repaired; and it consists in the improved construction and combination or arrangement of parts, which will be hereinafter fully disclosed in the description, drawings, and claims.

The objects of my invention are, first, to provide a device for clamping and holding together the ends of any broken part of a spectacle or eyeglass frame while they are being soldered and while the solder is hardening, and, second, to overcome the difficulties and defects hitherto experienced in the methods and devices generally employed for holding the broken parts together while soldering them.

For the purpose of clearly distinguishing the peculiarities and advantages of construction of my invention from the devices and methods hitherto employed in repairing spectacle-frames, so far as I am aware of them, I may state that one of the present ways of repairing consists in placing a piece of bent wire on the inside of the frame over the point at which the break has occurred. Then a piece of finer wire is wrapped around the broken part of the frame and said bent wire. The solder is then placed on the broken part. A red heat is then imparted to the frame, when the solder will flow, and then trouble may arise, as the finer wire, which is also subjected to the same heat, may expand or open up and slip sidewise, and also the coarser bent wire is apt to become soldered fast to the frame, when, if this occurs, said wire has to be cut out with a file. Then, again, if the broken part be not soldered perfectly, it becomes necessary to break the joint and solder it over again.

Another of the present ways of repairing spectacle-frames consists in taking the frame and securing the same with its broken parts fast to a piece of charcoal by means of pins or tacks, and in then applying the necessary solder and heat; but under this method of repairing the charcoal is liable to burn out from beneath the frame, when the ends of the broken part will become separated before being properly united by the solder.

I overcome these defects and difficulties with the construction and manner of operating with my new clamp, as will be apparent from the following description and accompanying drawings, in which the same reference-numerals indicate the same or corresponding parts.

Figure 2:
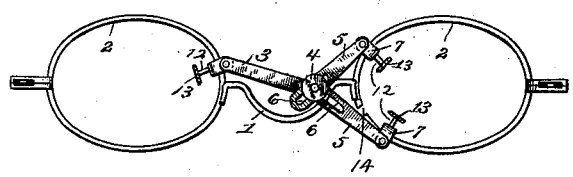
Figure 4:
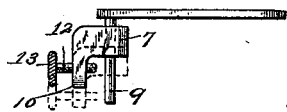
Figure 5:
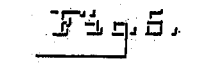
Figure 3:
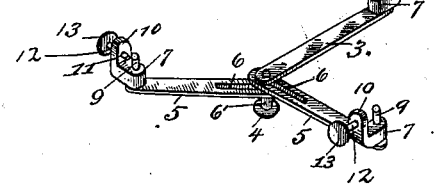

Figure 1 represents a top plan view of a spectacle or eyeglass frame having my clamp applied thereto for holding together the ends of the broken part of the nose-bridge, the break being near the right end thereof; Fig. 2, a similar view showing two of the arms of the clamp applied near the break in the eye-frame or glass-holder near one end of the bridge; Fig. 3, an enlarged detail perspective view of the under side of the clamp; Fig. 4, a side or edge view of one of the arms, showing the clamping-block in different positions by full and dotted lines; and Fig. 5, a sectional view of the outer end of one of the arms and its pivoted clamping-block.

In the drawings, the numeral 1 represents the bridge of the spectacle-frame, and 2 2 the two eye frames or holders for the glasses.

Although a spectacle-frame is shown in the drawings, it is obvious that the clamp may be employed for repairing broken eyeglass-frames as well.

The clamp comprises three arms, one of them, 3, having a screw-threaded hole in its inner end, in which is fitted a set or clamping screw, 4, the two other similar arms, 5 5, having longitudinal slots 6 in their inner ends, which permit them to be slid or adjusted upon said set or clamping screw, they being held in their adjusted positions by a collar or an enlargement, 6', beneath the head of said screw, and by the point of the latter resting in the screw-threaded opening in the arm 3. The outer ends of said arms are provided with pivoted clamping-blocks 7, which are formed at their inner ends with perforations 8, through which loosely pass pins 9, which are rigidly secured in the outer ends of the arms and project through said blocks, the ends of these pins forming the rigid jaws against which the spectacle-frame is held. As these clamping-blocks are loosely fitted upon the pins 9, they may be adjusted up or down, as shown in full and dotted lines in Fig. 4, and thus provision be made for adjusting the position of the broken frame as required, as in case it be not perfectly true or level while being repaired. The outer ends of these clamping-blocks are formed with downwardly-projecting lips 10, having screw-threaded holes 11, through which pass the clamping-screws 12, the outer ends of which are provided with milled or other suitable heads, 13. The inner ends of these screws are arranged opposite the downwardly-projecting ends of the pivotal pins 9, so that parts of the spectacle-frame may be clamped and firmly held against the latter by said screws.

In repairing spectacle or eyeglass frames with my device the clamping-block on the arm to which the central screw is secured at its lower end is moved to a point on the frame as far as possible from the break. This arm and its central screw will then serve as a support or fulcrum for the two slotted arms, which are then moved or adjusted and secured by their clamping-blocks suitably close to the broken parts 14. After the slotted arms have been slid upon the central screw and the broken parts of the frame brought into their proper relative positions, the slotted inner ends of said arms are secured in fixed position by the central screw passing through them and into the lower arm having the screw-threaded hole, and thus the broken parts of the frame may be held firmly in position while being soldered. As the three arms are swung and slid in nearly the same plane, or in planes parallel to each other, it follows that the ends of the broken part of the frame are necessarily held together in proper alignment, and that the slots in the inner ends of two of the arms serve to admit of the ends of said broken part being brought to register perfectly with each other.

The pivoted clamping-blocks will admit of the device being applied to all parts of the frame, as will be clearly seen by reference to Figs. 1 and 2, in which said clamping-blocks are shown as arranged or swung at various angles to the arms, according to the location of the broken part to which they are secured.

Having thus fully described the construction and combination or arrangement of the several parts of my invention, its advantages, and the manner of using the same, what I claim as new is—

1. In a clamp for holding spectacle-frames while being repaired, the combination, with the arms provided with the pins 9 at their outer ends and adjustably connected at their inner ends, of the clamping-blocks 7, provided with the screws 12 and loosely fitted upon said pins, substantially as described.

2. In a clamp for holding spectacle-frames while being repaired, the combination, with the slotted arms provided with the pins 9 at their outer ends and adjustably connected at their inner ends, of the clamping-blocks 7, provided with the screws 12 and loosely fitted upon said pins, substantially as described.

3. In a clamp for holding spectacle-frames while being repaired, the combination, with the arms provided with the pins 9 at their outer ends and formed with slots at their inner ends, of the clamping-blocks provided with the screws 12 and loosely fitted upon said pins, and a clamping or set screw, 4, for firmly holding together the slotted inner ends of said arms, substantially as described.

4. In a clamp for holding spectacle-frames while being repaired, the combination of an arm having a clamping-block at its outer end and a screw-threaded hole at its inner end, two other arms having clamping-blocks at their outer ends and longitudinal slots in their inner ends, and a clamping or set screw passed through said slots into said screw-threaded hole in the inner end of the arm first named, substantially as described.

5. In a clamp for holding spectacle-frames while being repaired, the combination of an arm having a pivoted clamping-block at its outer end and a screw-threaded hole at its inner end, a clamping-screw fitted in said screw-threaded hole, and two other arms having pivoted clamping-blocks at their outer ends and slots in their inner ends, which allow them to be longitudinally adjusted over said screw, substantially as described.

6. In a clamp for holding spectacle-frames, the combination of an arm having a pin projecting downwardly from its outer end, a clamping-screw in the inner end of said arm, two other arms having pins projecting downwardly from their outer ends and formed with longitudinal slots in their inner ends, which are movable over said screw, and clamping-blocks provided with perforations in their inner ends, in which are loosely fitted said pins, with lips at their outer ends, and with set-screws arranged with their inner ends opposite the sides of said pins, substantially as described.

In testimony whereof I affix my signature in presence of two witnesses.

NEWTON J. EDDY.

Witnesses:
 E. M. ALLEN,
 J. B. ROE.